United States Patent
Kolb

(10) Patent No.: US 9,017,593 B2
(45) Date of Patent: Apr. 28, 2015

(54) COMPOSITE MATERIALS COMPRISING PROPYLENE-BASED POLYMER BLEND COATINGS

(75) Inventor: Rainer Kolb, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 641 days.

(21) Appl. No.: 12/875,743

(22) Filed: Sep. 3, 2010

(65) Prior Publication Data

US 2011/0024951 A1     Feb. 3, 2011

Related U.S. Application Data

(63) Continuation-in-part of application No. 12/723,291, filed on Mar. 12, 2010.

(60) Provisional application No. 61/256,124, filed on Oct. 29, 2009, provisional application No. 61/187,431, filed on Jun. 16, 2009.

(51) Int. Cl.
| | |
|---|---|
| *C09D 123/14* | (2006.01) |
| *B29C 47/02* | (2006.01) |
| *B32B 27/32* | (2006.01) |
| *C08L 23/10* | (2006.01) |
| *C08L 23/14* | (2006.01) |
| *C09D 123/10* | (2006.01) |
| *B29C 47/00* | (2006.01) |
| *B29K 23/00* | (2006.01) |
| *B29K 67/00* | (2006.01) |
| *B29L 31/00* | (2006.01) |

(Continued)

(52) U.S. Cl.
CPC ............. *C09D 123/14* (2013.01); *B29C 47/004* (2013.01); *B29C 47/0014* (2013.01); *B29C 47/0021* (2013.01); *B29C 47/021* (2013.01); *B29K 2023/12* (2013.01); *B29K 2067/00* (2013.01); *B29L 2031/7158* (2013.01); *B32B 27/32* (2013.01); *C08L 23/10* (2013.01); *C08L 23/142* (2013.01); *C08L 45/00* (2013.01); *C08L 57/02* (2013.01); *C09D 123/10* (2013.01); *C09D 123/142* (2013.01)

(58) Field of Classification Search
None
See application file for complete search history.

(56) References Cited

U.S. PATENT DOCUMENTS

| | | | |
|---|---|---|---|
| 3,954,697 A | 5/1976 | McConnell et al. | |
| 4,061,835 A * | 12/1977 | Poppe et al. | ........... 428/522 |

(Continued)

FOREIGN PATENT DOCUMENTS

| | | |
|---|---|---|
| EP | 1 820 821 | 8/2007 |
| WO | WO 98/03603 | 1/1998 |

(Continued)

*Primary Examiner* — Monica Huson

(57) ABSTRACT

Coated composite materials and methods for their manufacture are described. In particular, embodiments of the present invention include a substrate material coated on at least a portion with a polymer blend comprising from about 50 to about 95 wt % of a propylene-based copolymer comprising propylene and from about 3 to about 40 wt % ethylene-derived units and from about 5 to about 50 wt % of a hydrocarbon resin. The propylene-based copolymer has a melting temperature less than about 110° C., a heat of fusion less than about 75 J/g, and a triad tacticity greater than 75%. The coating compositions are suitable for hot fill applications, soft to the touch and have a low coefficient of friction, low haze, and are able to retain textural design features. Methods for forming such coated composite materials are also provided.

24 Claims, 4 Drawing Sheets

(51) Int. Cl.
  *C08L 45/00* (2006.01)
  *C08L 57/02* (2006.01)

(56) References Cited

U.S. PATENT DOCUMENTS

| | | | |
|---|---|---|---|
| 4,857,594 | A | 8/1989 | Lakshmanan et al. |
| 5,523,343 | A | 6/1996 | Giordano et al. |
| 5,750,268 | A | 5/1998 | Mace et al. |
| 5,843,577 | A | 12/1998 | Ouhadi et al. |
| 5,858,471 | A | 1/1999 | Ray et al. |
| 5,976,450 | A * | 11/1999 | Mreijen ............... 264/512 |
| 6,090,195 | A * | 7/2000 | Andersen et al. ....... 106/162.51 |
| 6,139,930 | A | 10/2000 | Comer et al. |
| 6,312,641 | B1 | 11/2001 | Hutchinson |
| 6,352,426 | B1 | 3/2002 | Hutchinson et al. |
| 6,384,138 | B1 | 5/2002 | Jacob et al. |
| 6,391,408 | B1 | 5/2002 | Hutchinson |
| 6,676,883 | B2 | 1/2004 | Hutchinson et al. |
| 6,747,114 | B2 | 6/2004 | Karandinos et al. |
| 6,936,211 | B2 * | 8/2005 | Binner et al. ............. 264/295 |
| 6,939,591 | B2 | 9/2005 | Hutchinson et al. |
| 6,984,696 | B2 | 1/2006 | Curry et al. |
| 7,244,787 | B2 | 7/2007 | Curry et al. |
| 7,261,551 | B2 | 8/2007 | Hutchinson et al. |
| 7,332,204 | B2 | 2/2008 | Hutchinson et al. |
| 7,541,402 | B2 | 6/2009 | Abhari et al. |
| 2005/0107530 | A1 | 5/2005 | Datta et al. |
| 2006/0235159 | A1 | 10/2006 | Datta et al. |
| 2007/0021566 | A1 | 1/2007 | Tse et al. |
| 2008/0182940 | A1 | 7/2008 | Dharmarajan et al. |
| 2009/0133834 | A1 | 5/2009 | Lechat et al. |
| 2009/0258209 | A1 | 10/2009 | Jacob et al. |

FOREIGN PATENT DOCUMENTS

| | | |
|---|---|---|
| WO | WO 99/24516 | 5/1999 |
| WO | WO 2004/046214 | 6/2004 |
| WO | WO 2007/011460 | 1/2007 |
| WO | WO 2009/035580 | 3/2009 |
| WO | WO 2009/126712 | 10/2009 |
| WO | WO 2010/147706 | 12/2010 |
| WO | WO 2011/053406 | 5/2011 |

\* cited by examiner

COMPOSITE MATERIALS COMPRISING PROPYLENE-BASED POLYMER BLEND COATINGS

CROSS REFERENCE TO RELATED APPLICATIONS

This application claims priority from U.S. Provisional Patent Application No(s). 61/256,124, filed Oct. 29, 2009; 61/187,431, filed Jun. 16, 2009; and is a continuation-in-part of U.S. patent application Ser. No. 12/723,291, filed Mar. 12, 2010, each of which is herein incorporated by reference in its entirety. This application is related to U.S. Provisional patent application Ser. No. 12/869,161, filed Aug. 26, 2010, which is incorporated by reference in its entirety.

FIELD OF THE INVENTION

Provided are coating compositions, articles prepared with coating compositions, and methods for making the same. More particularly, this application provides a moldable coating composition for use with plastic articles, such as bottles.

BACKGROUND OF THE INVENTION

Polymers comprising propylene and ethylene and/or other α-olefin copolymers are well known in the art, and are useful in a wide variety of applications such as films, nonwoven fabrics, molded articles, and in surface coating applications. Additionally, blends of these polymers with other polymers, such as hydrocarbon resins, have been described.

For example, U.S. Pat. Nos. 6,984,696 and 7,244,787 describe blends of propylene-based polymers with hydrocarbon resins in amounts from 5 to 30 wt %. The polymer blends are said to be useful in film, fiber, and nonwoven applications.

U.S. Patent Application Publication No. 2005/0107530 describes propylene/ethylene/diene terpolymers blended with hydrocarbon resins in amounts from 1 to 30 wt %.

U.S. Patent Application Publication No. 2006/0235159 describes blends of a first polymer component with a second polymer component, and optionally from 1 to 30 wt % hydrocarbon resin. The second polymer component is a copolymer of propylene and ethylene.

U.S. Patent Application Publication No. 2008/0182940 describes polymer blends comprising propylene/ethylene copolymers or terpolymers blended with a propylene thermoplastic and one or more additives, wherein the listed additives include hydrocarbon and functionalized hydrocarbon resins.

U.S. Patent Application Publication No. 2009/0258209 describes polymer blends comprising propylene/ethylene/diene terpolymers blended with a polyolefin and oil. The polymer blends are said to contain substantially no fillers and have haze values less than 65%.

One application for propylene copolymers is as a surface coating for plastic bottles, to improve customer appeal of such products by providing good optical properties, high definition, and "soft touch". In order to be cost effective and maintain sufficient speed in filling lines, however, the coatings must also deliver an acceptably low coefficient of friction. Further, it is desirable that such coatings also exhibit the ability to retain small textural design details, sometimes referred to as "high definition".

It has been surprisingly found that blending certain propylene/α-olefin copolymers with one or more hydrocarbon resins results in a surface coating composition that combines soft touch, acceptable haze properties, and high definition with a lowered coefficient of friction, thus improving upon previously known surface coating materials.

SUMMARY OF THE INVENTION

Figure 1:
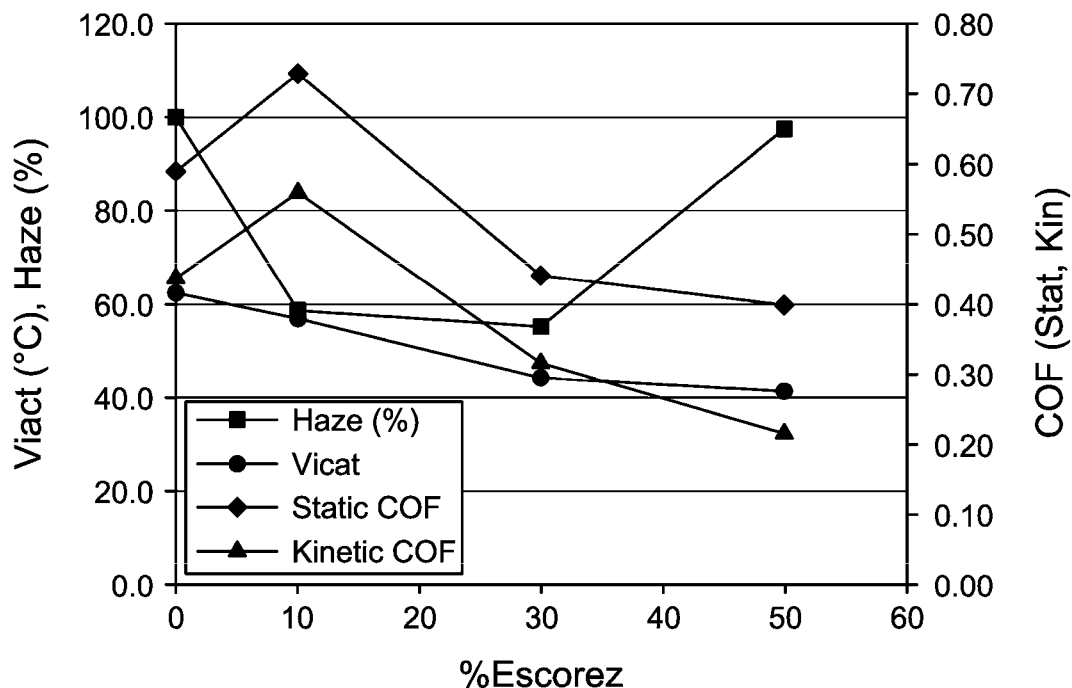
FIG. 1 depicts Vicat softening temperature, haze, and coefficient of friction as a function of the amount of hydrocarbon resin for polymer blend coatings according to the present invention.

The present invention is directed to coated composite materials and methods for their manufacture. In particular, embodiments of the present invention include a substrate material and a polymer blend coated on at least a portion of the substrate, said polymer blend comprising from about 50 to about 95 wt % of a propylene-based copolymer comprising propylene and from about 3 to about 40 wt % ethylene-derived units and from about 5 to about 50 wt % of a hydrocarbon resin. The propylene-based copolymer has a melting temperature less than about 110° C., a heat of fusion less than about 75 J/g, and a triad tacticity greater than 75%. The coating compositions are soft to the touch and have a low coefficient of friction, low haze, and are able to retain textural design features. Methods for forming such coated composite materials are also provided.

DETAILED DESCRIPTION OF THE INVENTION

The present invention is directed to composite materials and processes for forming such composite materials. In one or more embodiments of the present invention, the composite materials comprise a substrate and a coating composition. The coating composition comprises a polymer blend, wherein the blend comprises from about 50 to about 95 wt % of a propylene-based polymer and from about 5 to about 50 wt % of a hydrocarbon resin. In some embodiments, the propylene-based polymer comprises propylene and from about 5 to about 25 wt % units derived from ethylene and/or a $C_4$-$C_{10}$ α-olefin. The propylene-based copolymer also has a melting temperature less than about 105° C., a heat of fusion (Hf) less than about 75 J/g, and a triad tacticity greater than about 75%. In further embodiments, the coating composition has one or more of the following properties: a static coefficient of friction less than or equal to about 0.55; a kinetic coefficient of friction less than or equal to about 0.40; a Vicat softening temperature less than about 60° C.; or a haze value less than or equal to about 60%.

The present invention is also directed to processes for forming the composite materials described herein. In one or more embodiments, the composite materials are formed by providing a substrate material and applying a coating material to at least a portion of the substrate. In some embodiments, the coating material may be applied to the substrate by extrusion. In the same or other embodiments, the substrate is a bottle, and may be a polyethylene terephthalate (PET) bottle.

The following paragraphs describe the substrate, components of the coating composition, properties of the coating composition, and methods for forming the composite materials in further detail.

Substrates

The composite materials of the present invention comprise a substrate. The substrate may be of any form and may be formed from any material known by those skilled in the art for the formation of commercial articles. Such commercial articles include, but are not limited to, bags, bottles, jars, other containers, pouches, wraps, liners, signboards, roofing and construction materials, clothing, undergarments, medical gowns, and sheets. For example, acceptable substrates may comprise containers, films, membranes, woven fabrics, non-woven fabrics, sheets, or boards. The substrates may or may not be extensible. In these or other embodiments, the substrates may be formed from plastic, paper, cardboard, wood, metal, foil, or combinations thereof. In one or more embodiments, the substrate is a plastic container. In further embodiments, the substrate is a PET bottle.

In one or more embodiments of the present invention, the substrate is a plastic and may include one or more thermoplastic materials. In one or more embodiments, the plastic substrate may include, for example, one or more polyalkylene naphthalates, polyesters, co-polyesters, polyurethane, polyamids, polyamides, polyolefins, polyolefin homopolymers, polyolefin copolymers, acrylics, or cotton, and blends thereof. In certain embodiments, the polyesters may include polyolefin-terephthalates and polyalkylene terephthalates, such as polyethylene terephthalate (PET), poly(butylene terephthalate) (PBT), and poly(cyclohexane dimethylene terephthalate) (PCT).

In one or more embodiments, the plastic substrate may include one or more polyolefins, including polyolefin homopolymers and polyolefin copolymers. Illustrative polyolefins may be prepared from mono-olefin monomers which include, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. In one or more embodiments, the thermoplastic is unvulcanized or non cross-linked.

In one or more embodiments, the plastic substrate may include polypropylene. The polypropylene may be derived exclusively from propylene monomers (i.e., having only propylene units) or derived from mainly propylene (more than 80% propylene) with the remainder derived from olefins, particularly ethylene, and/or $C_4$-$C_{10}$ α-olefins.

In certain embodiments of the present invention, the substrate may comprise PET. The PET used in the plastic substrate may have an intrinsic viscosity of from about 0.5 dl/g to about 1.0 dl/g, or from about 0.6 dl/g to about 0.85 dl/g, or from about 0.7 dl/g to about 0.85 dl/g. The PET used in the plastic substrate may further have a density of from about 1.35 to about 1.47 g/cm$^3$ and a melting point of from about 200° C. to about 290° C., or from about 220° C. to about 280° C., or from about 230° C. to about 270° C. Suitable PET grades include Wellman AquaClear™ Ti844, ThermaClear™ Ti818, and PermaClear®, all commercially available from Wellman Inc., Bay St. Louis, Miss.

In one or more embodiments, the PET substrate can be in the form of a three dimensional object, including but not limited to a tubular preform. In one embodiment, the preform has a cap threads molded at the open end of the tube. In another embodiment, the PET substrate can be a three dimensional object including but not limited to a beverage container.

In some embodiments of the present invention, a polymer coating composition, described in more detail below, is applied to at least one side of the substrate. As used herein, the term "applied" is meant to include any method of placing the substrate in contact with the coating layer, and vice versa, and may include, for example, extrusion coating, extrusion lamination, coextrusion techniques, injection molding, and overmolding techniques, among other methods.

Propylene-Based Copolymers

The composite materials of the present invention comprise a coating layer disposed on at least a portion of a substrate. In some embodiments, the coating layer comprises a propylene-based copolymer, which comprises propylene and from about 5 to about 25 wt % units derived from ethylene and/or a $C_4$-$C_{10}$ alpha-olefin. In one or more embodiments, the alpha-olefin comonomer units may derive from ethylene, butene, pentene, hexene, 4-methyl-1-pentene, octene, or decene. The embodiments described below are discussed with reference to ethylene as the alpha-olefin comonomer, but the embodiments are equally applicable to other copolymers with other alpha-olefin comonomers. In this regard, the copolymer may simply be referred to as propylene-based copolymers with reference to ethylene as the alpha-olefin.

In one or more embodiments, the propylene-based copolymer may include at least about 5 wt %, at least about 6 wt %, at least about 7 wt %, or at least about 8 wt % ethylene-derived units. In those or other embodiments, the copolymers may include up to about 25 wt %, or up to about 20 wt %, or up to about 19 wt %, or up to about 18 wt %, or up to about 17 wt % ethylene-derived units, where the percentage by weight is based upon the total weight of the propylene-derived and alpha-olefin derived units. Stated another way, the propylene-based elastomer may include at least about 75 wt %, or at least about 80 wt %, or at least about 81 wt % propylene-derived units, or at least about 82 wt % propylene-derived units, or at least about 83 wt % propylene-derived units; and in these or other embodiments, the copolymers may include up to about 95 wt %, or up to about 94 wt %, or up to about 93 wt %, or up to about 92 wt % propylene-derived units, where the percentage by weight is based upon the total weight of the propylene-derived and alpha-olefin derived units.

The propylene-based copolymers of one or more embodiments are characterized by having a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In one or more embodiments, the Tm of the propylene-based copolymer (as determined by DSC) is less than about 115° C., or less than about 110° C., or less than about 100° C., or less than about 90° C.

In one or more embodiments, the propylene-based copolymer may be characterized by a Hf, as determined by DSC. In one or more embodiments, the propylene-based copolymer may be characterized by a Hf that is at least about 0.5 J/g, or at least about 1.0 J/g, or at least about 1.5 J/g, or at least about 3.0 J/g, or at least about 4.0 J/g, or at least about 6.0 J/g, or at least about 7.0 J/g. In these or other embodiments, the propylene-based copolymer may be characterized by a Hf of less than about 75 J/g, or less than about 70 J/g, or less than about 60 J/g, or less than about 50 J/g, or less than about 30 J/g.

As used within this specification, DSC procedures for determining Tm and Hf include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the Hf of the polymer.

The propylene-based copolymer can have a triad tacticity of three propylene units, as measured by 13C NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042. If the triad tacticity of the copolymer is too high, the level of stereo-irregular disruption of the chain is too low and the material may not be compatible and sufficiently flexible for its purpose in a coating layer. If the triad tacticity is too low, the bonding strength of the coating to the substrate may be too low.

In one or more embodiments, the propylene-based copolymer may have a crystallinity of from about 0.5% to about 40%, or from about 1% to about 30%, or from about 5% to about 25%, determined according to DSC procedures. Crystallinity may be determined by dividing the Hf of a sample by the Hf of a 100% crystalline polymer, which is assumed to be 189 joules/gram for isotactic polypropylene or 350 joules/gram for polyethylene.

In one or more embodiments, the propylene-based copolymer may have a density of from about 0.85 g/cm$^3$ to about 0.92 g/cm3, or from about 0.86 g/cm3 to about 0.90 g/cm3, or from about 0.86 g/cm3 to about 0.89 g/cm3 at room temperature as measured per the ASTM D-792 test method.

In one or more embodiments, the propylene-based copolymer can have an melt index (MI) (ASTM D-1238, 2.16 kg @ 190° C.), of less than or equal to about 10 g/10 min, or less than or equal to about 7.5 g/10 min, or less than or equal to about 6.5 g/10 min.

In one or more embodiments, the propylene-based copolymer can have a melt flow rate (MFR), as measured according to the ASTM D-1238, 2.16 kg weight @ 230° C., equal to or greater than about 0.3 g/10 min, or at least about 0.5 g/10 min, or at least about 0.8 g/10 min, or at least about 1.0 g/10 min. In these or other embodiments, the melt flow rate may be equal to or less than about 350 g/10 min, or less than about 250 g/10 min, or less than about 100 g/10 min, or less than about 50 g/10 min, or less than about 25 g/10 min. In some embodiments of the present invention, the MFR of the propylene-based copolymer is between about 0.5 and about 50 g/10 min, or between about 0.8 and about 25 g/10 min.

In one or more embodiments, the propylene-based copolymer may have a Mooney viscosity [ML (1+4) @ 125° C.], as determined according to ASTM D-1646, of less than about 100, or less than about 75, or less than about 50, or less than about 30.

In one or more embodiments, the propylene-based copolymer can have a weight average molecular weight (Mw) of from about 5,000 to about 5,000,000 g/mole, or from about 10,000 to about 1,000,000 g/mole, or from about 20,000 to about 500,000 g/mole, or from about 50,000 to about 400,000 g/mole.

In one or more embodiments, the propylene-based copolymer can have a number average molecular weight (Mn) of from about 2,500 to about 2,500,000 g/mole, or from about 5,000 to about 500,000 g/mole, or from about 10,000 to about 250,000 g/mole, or from about 25,000 to about 200,000 g/mole.

In one or more embodiments, the propylene-based copolymer can have a Z-average molecular weight (Mz) of from about 10,000 to about 7,000,000 g/mole, or from about 50,000 to about 1,000,000 g/mole, or from about 80,000 to about 700,000 g/mole, or from about 100,000 to about 500,000 g/mole.

In one or more embodiments, the molecular weight distribution (MWD=(Mw/Mn)) of the propylene-based copolymer may be from about 1 to about 40, or from about 1 to about 15, or from about 1.8 to about 5, or from about 1.8 to about 3.

Techniques for determining the molecular weight (Mn, Mw and Mz) and MWD may be found in U.S. Pat. No. 4,540,753 (Cozewith, Ju and Verstrate) (which is incorporated by reference herein for purposes of U.S. practices) and references cited therein and in Ver Strate et al., "*Near Monodisperse Ethylene-Propylene Copolymers by Direct Ziegler-Natta Polymerization. Preparation, Characterization, Properties,*" Vol. 21, Macromolecules (1988), pp. 3360-3371, which is herein incorporated by reference for purposes of U.S. practices, and references cited therein. For example, molecular weight may be determined by size exclusion chromatography (SEC) by using a Waters 150 gel permeation chromatograph equipped with the differential refractive index detector and calibrated using polystyrene standards.

Preparation of the Propylene-Based Copolymer

The triad tacticity and tacticity index of the propylene-based copolymer may be controlled by the catalyst, which influences the stereoregularity of propylene placement, the polymerization temperature, according to which stereoregularity can be reduced by increasing the temperature, and by the type and amount of a comonomer, which tends to disrupt reduce the level of longer propylene derived sequences.

Too much comonomer will reduce the crystallinity provided by the crystallization of stereoregular propylene derived sequences to the point where the material lacks strength; too little and the material will be too crystalline. The comonomer content and sequence distribution of the polymers can be measured using $^{13}$C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045×2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis.

Reference is made to U.S. Pat. No. 6,525,157, whose test methods are also fully applicable for the various measurements referred to in this specification and claims and which contains more details on GPC measurements, the determination of ethylene content by NMR and the DSC measurements.

The catalyst may also control the stereoregularity in combination with the comonomer and the polymerization temperature. The catalyst should however be capable of a level of stereoregular placement, generally by suitable chirality of the single site catalyst. The polymer can be prepared using any single sited catalyst. Such a catalyst may be a transition metal complex generally containing a transition metal Groups 3 to 10 of the Periodic Table and at least one ancillary ligand that remains bonded to the transition metal during polymerization. Preferably the transition metal is used in a reduced cationic state and stabilized by a cocatalyst or activator.

The ancillary ligand may be a structure capable of forming a it bond such a cyclopentadienyl type ring structure (See EP0129368, EP0284708, Rieger EP1070087 and U.S. Pat. No. 6,559,262). The ancillary ligand may also be a pyridinyl or amide ligand (See WO2003/040201). The transition metal is preferably of Group 4 of the Periodic table such as titanium, hafnium or zirconium, which is used in polymerization in the $d^0$ mono-valent cationic state and has one or two ancillary ligands as described in more detail hereafter. The important features of such catalysts for coordination polymerization are the ligand capable of abstraction and that ligand into which the ethylene (olefinic) group can be inserted.

The manner of activation of the single site catalyst can vary. Alumoxane and preferably methyl alumoxane can be used suitably in an amount to provide a molar aluminum to metallocene ratio of from 1:1 to 20,000:1. Higher molecular weights can be obtained using non- or weakly coordinating anion activators (NCA) derived and generated in any of the ways amply described in published patent art such as European Application Nos.: 0277004; 0426637; 0426638; and many others. The NCA can be a Group 10-14 complex wherein boron or aluminum is the charge-bearing atom shielded by ligands, which may be halogenated, and especially perfluorinated. Preferably tetra-aryl-substituted Group 10-14 non-carbon element-based anion, especially those that are have fluorine groups substituted for hydrogen atoms on the aryl groups, or on alkyl substituents on those aryl groups. The NCA may be used in approximately equimolar amounts relative to the transition metal complex, such as at least 0.25, preferably 0.5, and especially 0.8 and such as no more than 4, preferably 2 and especially 1.5. Further options are described in U.S. Pat. Nos. 6,048,950; 6,448,358; 6,265,212; 5,198,401; 5,391,629; and International Publication No. WO 1998/27154.

The polymerization reaction is conducted by reacting monomers in the presence of a catalyst system described herein at a temperature of from 0° C. to 200° C. for a time of from 1 second to 10 hours. Preferably homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used.

Further description of exemplary methods suitable for preparation of the propylene-based copolymers described herein may be found in U.S. Pat. No. 6,881,800, which is incorporated by reference herein for purposes of U.S. practice.

Exemplary polymer blends may include one or more of the following commercial polymers. Preferred propylene-based polyolefin polymers are available commercially under the trade names Vistamaxx™ (ExxonMobil Chemical Company, Houston, Tex., USA) and Versify™ (The Dow Chemical Company, Midland, Mich., USA), certain grades of Tafmer™ XM or Notio™ (Mitsui Company, Japan) or certain grades of Softell™ (LyondellBasell Polyolefine GmbH, Germany). A commercial example of an ethylene-based polyolefin copolymer is Infuse™ olefin block copolymers (Dow Chemical).

Hydrocarbon Resins

The coating compositions of the present invention comprise one or more hydrocarbon resins. The hydrocarbon resins ("HCR") can be derived from petroleum, and may comprise hydrogenated or non-hydrogenated resins. Useful HCR include, but are not limited to, aliphatic hydrocarbon resins, aromatic modified aliphatic hydrocarbon resins, aliphatic/aromatic resins, polycyclic resins, hydrogenated polycyclic resins, hydrogenated polycyclic aromatic resins, hydrogenated aromatic resins in which a substantial portion of the benzene rings are converted to cyclohexane rings, gum rosins, gum rosin esters, wood rosins, wood rosin esters, tall oil rosins, tall oil rosin esters, polyterpenes, aromatic modified polyterpenes, terpene phenolics, and combinations thereof. The HCRs may be polar or apolar.

In one or more embodiments, the HCR contains one or more petroleum resins, terpene resins, styrene resins, and/or cyclopentadiene resins. In one or more embodiments, the HCR is selected from the group consisting of aliphatic HCR, hydrogenated aliphatic HCR, aliphatic/aromatic HCR, hydrogenated aliphatic aromatic HCR, cycloaliphatic HCR, hydrogenated cycloaliphatic resins, cycloaliphatic/aromatic HCR, hydrogenated cycloaliphatic/aromatic HCR, hydrogenated aromatic HCR, polyterpene resins, terpene-phenol resins, rosins and rosin esters, hydrogenated rosins and rosin esters, and combinations thereof. Preferred aliphatic olefins are $C_4$-$C_{20}$, or $C_4$-$C_7$, linear, branched, or alicyclic olefins or non-conjugated diolefins. Preferred aromatic olefins include one or more of styrene, indene, derivatives of styrene and derivatives of indene. Particularly preferred aromatic olefins include styrene, alpha-methylstyrene, beta-methylstyrene, indene and methylindenes, and vinyl toluenes. In some embodiments, the HCR may comprise monomers derived from piperylene, isoprene, amylene, cyclics, styrene, indene, or combinations thereof.

The HCR may include one or more styrenic components, such as styrene, derivatives of styrene, and substituted styrenes. In general, styrenic components do not include fused-rings, such as indene. The HCR may include one or more indenic components, such as indene and derivatives of indene. In some embodiments, the styrenic component may have a lowering effect on the HCR softening point. Other aromatics (especially indenics) may tend to increase the HCR softening point. In other embodiments, the HCR may include cyclopentadiene (CPD) and/or di-cyclopentadiene (DCPD), or derivatives thereof, which have a broadening effect on molecular weight distribution and tend to increase the HCR softening point.

The HCR may be produced by any method generally known in the art for the production of HCR. See, for example, the Kirk-Othmer Encyclopedia of Chemical Technology, 4$^{th}$ Ed., Vol. 13, pp. 717-744. For example, in some embodiments, the HCR is produced by thermal polymerization, while in other embodiments the HCR may be produced by catalytic polymerization. The polymerization and stripping conditions may be adjusted according to the nature of the feed to obtain the desired resin.

In one or more embodiments, the HCR may be prepared by thermal polymerization. For example, the resin may be thermally polymerized from a feed containing CPD in a benzene or toluene solvent for 2.0 to 4.0 hours at 220° C. to 280° C. and about 14 bars pressure, with conditions being adjusted to control the molecular weight and softening point of the resin. The feed may further contain alkylCPD's, dimers and codimers of CPD and methylcyclopentadiene, and other acyclic dienes such as 1,3-piperylene and isoprene. Other copolymerizable unsaturated monomers such as vinyl aromatics including styrene, α-methylstyrene, indene, and vinyl toluene may also be present.

In one or more embodiments, the HCR may be catalytically polymerized. A preferred method for production of the resins is combining the feed stream in a polymerization reactor with a Friedel-Crafts or Lewis Acid catalyst at a temperature between 0° C. and 200° C., preferably between 20° C. and 80° C. Friedel-Crafts polymerization is generally accomplished by use of known catalysts in a polymerization solvent, and removal of solvent and catalyst by washing and distillation. The polymerization process may be in a batchwise or continuous mode. Continuous polymerization may be in a single stage or in multiple stages. The Friedel-Crafts catalysts to be used are generally Lewis Acids such as boron trifluoride ($BF_3$), complexes of boron trifluoride ($BF_3$), aluminum trichloride ($AlCl_3$), or alkyl-aluminum halides, particularly chloride. The amount of Lewis Acid to be used in the catalyst is in the range of from 0.3 to 3.0 wt %, based upon the weight of the feed blend, preferably 0.5 to 1.0 wt %. The aluminum trichloride catalyst is preferably used as a powder.

In one or more embodiments, the resins may be hydrogenated. Any known process for catalytically hydrogenating HCR may be used to hydrogenate the resin. The hydrogenation of HCR may be carried out via molten or solution based processes by either a batchwise or, more commonly, a continuous process. Catalysts employed for the hydrogenation of HCR are typically supported monometallic and bimetallic catalyst systems. The catalysts which may be used may include Group VIII metals such as nickel, palladium, ruthenium, rhodium, cobalt, and platinum, Group VI metals such as tungsten, chromium, and molybdenum, Group VII metals such as rhenium, manganese, and copper, other catalysts may be based on group 9, 10, or 11 elements. These metals maybe used singularly or in combination of two or more metals, in the metallic form or in an activated form and may be used directly or carried on a solid support such as alumina or silica-alumina. The support material is typically comprised of such porous inorganic refractory oxides such as silica, magnesia, silica-magnesia, zirconia, silica-zirconia, titanic silica-titania, alumina, silica-aluminum alumino-silicate, etc. Preferably, the supports are essentially free of crystalline molecular sieve materials. Mixtures of the foregoing oxides are also contemplated, especially when prepared as homogeneously as possible. Preferred supports include alumina, silica, carbon, MgO, $TiO_2$, $ZrO_2$, $FeO_3$, or mixtures thereof.

In some embodiments, the HCR may have a Mn less than 5000, or less than 2000, or in the range of from 100 to 1000, or in the range of from 100 to 500. Further, the HCR may have a ring and ball softening point in the range of from 20° C. to 180° C., or from 50° C. to 140° C., or from 80° C. to 120° C. In one or more embodiments, the HCR has a glass transition temperature (Tg) between about 30° C. and about 125° C., or between about 35° C. and about 120° C., or between about 40° C. and about 105° C., or between about 45° C. and about 90° C. In one or more embodiments, the HCR has a Mw of 4000 or less, or between 300 and 4000, or between 300 and 2500, or between 300 and 1000. In one or more embodiments, the HCR has a Mw/Mn of 4 or less, or between 1 and 2.4, or between 1 and 2.2.

In one or more embodiments of the present invention, the HCR has a glass transition temperature between about 35° C. and about 120° C., a Mw between about 100 and about 1000, and a Mn between about 100 and about 500.

In at least one specific embodiment, the HCR may have a melt viscosity at 160° C. of from 250 cPs to 1500 cPs, a Mn of 150-1200 g/mole, a Mw of 300-3000 g/mole, and a Tg of 40° C. to 130° C.

Commercially available HCR that are suitable for use herein include EMPR 120, 104, 111, 106, 112, and 115, EMFR 100 and 100A, ECR-373, ESCOREZ™ 2101, 2203, 2520, 5380, 5600, 5618, and 5690, and the Oppera™ series of polymeric additives (commercially available from ExxonMobil Chemical Company); ARKON™ M90, M100, M115 and M135 and SUPER ESTER™ rosin esters (commercially available from Arakawa Chemical Company of Japan); SYLVARES™ phenol modified styrene, methyl styrene resins, styrenated terpene resins, ZONATAC™ terpene-aromatic resins, and terpene phenolic resins (commercially available from Arizona Chemical Company of Jacksonville, Fla.); SYLVATAC™ and SYLVALITE™ rosin esters (commercially available from Arizona Chemical Company of Jacksonville, Fla.); NORSOLENE™ aliphatic aromatic resins (commercially available from Cray Valley of France); DERTOPHENE™ terpene phenolic resins (commercially available from DRT Chemical Company of Landes, France); EASTOTAC™ resins, PICCOTAC™ $C_5/C_9$ resins, REGALITE™ and REGALREZ™ aromatic and REGALITE™ cycloaliphatic/aromatic resins (commercially available from Eastman Chemical Company of Kingsport, Tenn.); WINGTACK™ ET and EXTRA™ (commercially available from Sartomer of Exton, Pa.); FORAL™, PENTALYN™, and PERMALYN™ rosins and rosin esters (commercially available from Hercules, now Eastman Chemical Company of Kingsport, Tenn.); QUINTONE™ acid modified $C_5$ resins, $C_5/C_9$ resins, and acid modified $C_5/C_9$ resins (commercially available from Nippon Zeon of Japan); and LX™ mixed aromatic/cycloaliphatic resins (commercially available from Neville Chemical Company of Pittsburgh, Pa.); CLEARON™ hydrogenated terpene aromatic resins (commercially available from Yasuhara of Japan); and PICCOLYTE™ (commercially available from Loos & Dilworth, Inc. of Bristol, Pa.). Other suitable HCR can be found in U.S. Pat. No. 5,667,902, incorporated herein by reference. The preceding examples are illustrative only and by no means limiting.

In at least one other specific embodiment, the HCR can be or include saturated alicyclic resins. Such resins, if used, can have a softening point in the range of from 85° C. to 140° C., or preferably in the range of 100° C. to 140° C., as measured by the ring and ball technique. Examples of suitable, commercially available saturated alicyclic resins are ARKON-P® (commercially available from Arakawa Forest Chemical Industries, Ltd., of Japan).

In one or more embodiments, the coating compositions described herein may comprise from about 5 to about 50 wt %, or from about 15 to about 48 wt %, or from about 25 to about 45 wt %, or from about 25 to about 35 wt % of the HCR component, where the balance of the coating composition comprises a propylene-based copolymer as described herein.

Properties of the Polymer Blend Coating Compositions

In one or more embodiments of the present invention, the coating compositions described herein comprise a blend of a propylene-based copolymer and one or more HCR. In some embodiments, the coating compositions comprise from about 5 to about 50 wt %, or from about 15 to about 48 wt %, or from about 25 to about 45 wt %, or from about 25 to about 35 wt % of the one or more HCR, and the balance of the composition comprises a propylene-based copolymer.

In some embodiments of the invention, the coating compositions may comprise two or more propylene-based copolymers and one or more HCR. In embodiments in which two or more propylene-based copolymers are employed, the coating compositions may comprise from about 5 to about 65 wt %, or from about 10 to about 60 wt %, or from about 15 to about 55 wt %, or from about 20 to about 50 wt % of the one or more HCR. In such embodiments, the coating compositions may comprise from about 35 to about 85 wt %, or from about 40 to about 80 wt % of a first propylene-based copolymer and from about 1 to about 20 wt %, or from about 5 to about 15 wt % of a second propylene-based copolymer based on the total weight of the coating composition, such that the total propylene-based copolymer content of the coating composition is from about 35 to about 95 wt %, or from about 40 to 90 wt %, or from about 45 to about 85 wt %, or from about 50 to about 80 wt %. For example, a coating composition may comprise from about 40 to about 80 wt % of a first propylene-based copolymer, from about 5 to about 15 wt % of a second propylene-based copolymer, and from about 15 to about 55 wt % of one or more HCR.

The coating compositions described herein may further comprise one or more additives. Additives which may be incorporated include, but are not limited to, antioxidants, stabilizers, pigments, processing aids, flow improvers, mold release agents, dispersing agents, slip agents, plasticizers, vulcanizing or curative agents, processing aids, and the like. Antiblocking agents, coloring agents, lubricants, nucleating agents, reinforcements, and fillers (including granular, fibrous, or powder-like) may also be employed. Primary and secondary antioxidants include, for example, hindered phenols, hindered amines, and phosphates. Nucleating agents include, for example, sodium benzoate and talc. Also, to improve crystallization rates, other nucleating agents may also be employed such as Ziegler-Natta olefin products or other highly crystalline polymers. Other additives such as dispersing agents, for example, Acrowax C, can also be included. Slip agents include, for example, oleamide and erucamide. In some embodiments of the invention, the coating composition further comprises from about 0.01 wt % to about 1.5 wt % of a slip agent. In one embodiment, the slip agent is erucamide.

The coating compositions described herein may also comprise inorganic particulate fillers, which may improve the mechanical properties of the compositions and advantageously reduce gas permeability. The amount of inorganic filler used is typically less than about 75 wt %, or less than about 60 wt %, or less than about 30 wt %, based on the total weight of the composition. Such inorganic fillers may include clays, titanium and magnesium oxides, and silica. In addition, other particulate fillers, such as calcium carbonate, zinc oxide, whiting, and magnesium oxide, may also be used.

The coating compositions described herein may further comprise process oil, in the range of from 0 to 500 parts by weight, or from 2 to 200 parts by weight, or from 5 to 150 parts by weight, or from 10 to 100 parts by weight, per hundred parts of total polymer. For purposes of this disclosure, the term "process oil" refers to any oil or a variety of oils having molecular weights (Mn) of less than 20,000. The addition of process oils to lower the glass transition temperature of blends of isotactic polypropylene and ethylene propylene diene rubber is described in U.S. Pat. Nos. 5,290,886 and 5,397,832, which are incorporated by reference herein.

The coating compositions described herein are generally soft to the touch and have low coefficients of friction, desirable mechanical properties such as tensile performance, and comparable or lower haze values when compared to the propylene-based copolymers alone. Additionally, the coatings are well suited for use in a variety of commercial applications due to their ability to retain small textural design details, often referred to as "high definition". Further, the relatively low coefficient of friction ("COF") measurements demonstrated by these coating compositions increases efficiency and lowers costs by allowing for higher speed filling lines.

In one or more embodiments of the present invention, the coating compositions described herein may have a static coefficient of friction less than or equal to about 0.60, or less than or equal to about 0.55, or less than or equal to about 0.50, or less than or equal to about 0.45. In the same or other embodiments, the coating compositions may have a kinetic coefficient of friction less than or equal to about 0.45, or less than or equal to about 0.40, or less than or equal to about 0.35, or less than or equal to about 0.30. As reported herein, the static and kinetic coefficients of friction, reported without units, were measured as specified in ASTM D-1894, except that the measurements were carried out such that a plaque surface (examples 1-16) was measured against a high density polyethylene film surface (grade HD9076 available from ExxonMobil Chemical Company).

In one or more embodiments of the present invention, the coating compositions described herein may have a Vicat softening point, as determined by ASTM D1525 (200 g), of about 70° C. or less, or about 65° C. or less, or about 60° C. or less, or about 55° C. or less, or about 50° C. or less, or about 45° C. or less. Haze was measured on 1 mm thick compression molded plaques using the procedure according to ASTM D-1003. In the same or other embodiments, the coating compositions have a haze value, as determined by ASTM D-1003, of about 80% or less, or about 75% or less, or about 70% or less, or about 65% or less, or about 60% or less.

In one or more embodiments of the present invention, the coating compositions described herein have one or more of the following properties: a static coefficient of friction less than or equal to about 0.55; a kinetic coefficient of friction less than or equal to about 0.40; a Vicat softening temperature less than about 60° C.; and a haze value less than or equal to about 60%. In further embodiments, the coating compositions possess at least two of the preceding properties, or at least three of the preceding properties, or all of the preceding properties.

Further, in some embodiments, the coating compositions of the present invention have similar or improved tensile properties when compared to compositions comprising the propylene-based copolymer alone. For example, the coating compositions may have an advantageously increased modulus while still be soft to the touch as evidenced by the Vicat softening point. In one or more embodiments, the coating compositions have a 1% secant modulus of greater than 15,000 psi (103422 kPa) or greater than 20,000 psi (137896 kPa), or greater than 30,000 psi (206844 kPa), or greater than 70,000 psi (482636 kPa) while simultaneously having a Vicat softening points (200 g) of less than 80° C., or less than 70° C., or less than 50° C., or less than 45° C. In one or more embodiments of the present invention, softness and tensile properties of the coating compositions are optimized when the coating blends comprise approximately 20 wt % to 40 wt % HCR, or approximately 30 wt % HCR.

Formation of Composite Materials

In one or more embodiments of the present invention, the composite materials of the invention are formed by providing a substrate and applying a coating composition as described herein to at least one portion of the substrate. As used herein, the term "apply" is meant to include any method known to those skilled in the art for placing the substrate in contact with the coating layer, and vice versa, and may include, for example, extrusion coating and extrusion lamination, among other methods.

In one or more embodiments of the present invention, the coating composition is applied to the substrate by extrusion. In the same or other embodiments, the coating composition is extruded onto a container, such as, for example, a plastic bottle. In further embodiments, the substrate comprises a PET bottle.

In one or more embodiments of the present invention, the coated articles can be bottles for containing beverages, such as colas, water, juice, sports drinks, beer, wine, and other consumables. Any method or technique suitable for making bottles can be used to form the coated articles, including but not limited to blow molding techniques and stretch blow molding techniques. In one embodiment, a plastic substrate is made into a preform and then at least partially coated with the coating composition layer(s) described herein. The coated preforms can then be processed by conventional blow molding techniques to form the finished coated article. Suitable techniques are described in U.S. Pat. Nos. 7,332,204; 7,261, 551; 6,939,591; 6,676,883; 6,391,408; 6,312,641; and U.S. Patent Application Publication No. 2008/0061476, all of which are incorporated by reference herein for the purposes of U.S. practice. In another embodiment, the coating layer(s) can be extruded or co-extruded (if more than one layer) into the shape of a tube, which can then be cut into lengths corresponding to the length of the plastic substrate preform. The resulting cut tube can then be placed inside a mold and injected over the plastic substrate preform to form a coated preform. The coated preform can then be blow-molded to form the coated article. This and any other "over-molding" or "inject-over-inject molding" techniques may be used, including those described in more detail in U.S. Patent Application Publication No. 2008/0061476 and U.S. Pat. Nos. 5,464,106; 5,851,471; 6,312,641; 6,352,426; and 7,332,204, all of which are incorporated by reference herein for the purposes of U.S. practice.

In some embodiments, the coating compositions of the present invention are particularly well suited for use in "hot fill" processes. In such processes, a preform is heated, usually to approximately 120° C., and the preform is placed in a blow molding apparatus. Pressurized air is then used to expand the preform until it takes the shape of the cavity (mold) of the blow molding apparatus and forms a container. During the blowing process, the coating material on the outside surface of the preform comes into contact with the hot mold. In typical hot fill processes, the temperature of the mold is about 140° C. or higher. For example, the temperature of the mold may be greater than about 135° C., greater than about 140° C., greater than about 145° C., greater than about 150° C., or greater than about 155° C. Such temperatures are well above the melting points of many propylene-based surface coating compositions, making them unsuitable for use in hot fill processes because the coatings do not solidify fast enough or melt during the hot fill process and stick to the mold. In some instances, these problems may be overcome by adding a higher melting component such as isotactic homopolypropylene (iPP). Adding amounts of iPP sufficient to form over-molded containers in a hot fill process would have significant drawbacks, however, such as reductions in elasticity, optical properties, softness, definition, and tactile properties. The formulations of the present invention overcome these problems by adding an additional component (HCR) that offsets the drawbacks of typical propylene-based coatings.

The coating compositions or layers provided herein adhere well to plastic substrates, provide even coatings, and are free or at least substantially free of any structural defects. The coating materials also retain the surface structure and surface texture of the mold used during the blow molding process, which significantly improves the surface structure and texture of the coated article and enables design options not achievable with the plastic substrate alone. Such design options include embossed or engraved structures that are characterized by having very small spatial resolution, such as less than 1 mm, or less than 500 µm, or less than 250 µm, or less than 100 µm. The coating compositions also exhibit excellent optics, such as low haze, good transparency, and high gloss. Further, the coating compositions provide excellent tactile properties, such as good grip, soft feel and low surface friction to maintain high bottles speeds. Finally, the coating compositions maintain the ability to recycle the coated articles.

EXAMPLES

With reference to the following examples and figures, the following identifiers are used:

Copolymer A is a propylene-based copolymer as described herein, with an ethylene content of about 8.5 wt %, an MFR of about 8.3 g/10 min (230° C., 2.16 kg), and a Shore A hardness of about 89;

Copolymer B is a propylene-based copolymer as described herein, with an ethylene content of about 16.0 wt %, an MFR of about 3.0 g/10 min (230° C., 2.16 kg), and a Shore A hardness of about 67;

Copolymer C is a propylene-based copolymer as described herein, with an ethylene content of about 15.0 wt %, an MFR of about 18 g/10 min (230° C., 2.16 kg), and a Shore A hardness of about 61;

Copolymer D is a propylene-based copolymer as described herein, with an ethylene content of about 10.5 wt %, an MFR of about 2.2 g/10 min (230° C., 2.16 kg), and a Shore A hardness of about 85;

Copolymer E is a propylene copolymer having an ethylene content of about 8 wt % and an MFR of about 28 g. 10 min (230° C., 2.16 kg);

Copolymer F is a 50/50 blend of a propylene copolymer having an ethylene content of about 9 wt % and an MFR of about 8 g/10 min (230° C., 2.16 kg) and a propylene copolymer having an ethylene content of about 7 wt % and an MFR of about 7 g/10 min (230° C., 2.16 kg);

HCR 1 is a cycloaliphatic HCR available under the trade name Escorez 5300 from ExxonMobil Chemical Co;

HCR 2 is an amorphous cyclic olefin oligomer HCR available under the trade name Oppera PR100A from ExxonMobil Chemical Co;

HCR 3 is a blend of isotactic polypropylene and an amorphous cyclic olefin oligomer HCR available under the trade name Oppera PA609A from ExxonMobil Chemical Co;

PP 1 is a propylene random copolymer with an MFR of about 24 g/10 min (230° C., 2.16 kg);

PP 2 is a propylene homopolymer with an MFR of about 1.6 g/10 min (230° C., 2.16 kg);

PP3 is a propylene ethylene copolymer having an ethylene content of about 2.15 wt % and an MFR ranging from about 9 to about 15 g/10 min (230° C., 2.16 kg); and PP4 is a propylene ethylene copolymer having an ethylene content of about 1.3 wt % and an MFR ranging from about 4 to about 7 g/10 min (230° C., 2.16 kg).

Coating materials were prepared comprising propylene-based copolymers and HCR's as described herein. These materials were tested for a variety of mechanical properties. The resulting compositions and their properties are reflected in the Tables described below.

A variety of copolymer coating blends were prepared from Copolymer A and HCR 1, HCR 2, or HCR 3, and designated as Examples 1 through 8. Pure Copolymer A (not blended with HCR) was used as a control and designated as Example 9. The compositions and mechanical properties of the resulting blends are given in Table 1. Specimens that did not break during stress and strain at break testing are designated by "nb".

TABLE 1

| | Example No. | | | | | | | | |
|---|---|---|---|---|---|---|---|---|---|
| | 1 | 2 | 3 | 4 | 5 | 6 | 7 | 8 | 9 |
| Composition, wt % | | | | | | | | | |
| Copolymer A | 90 | 70 | 50 | 90 | 70 | 50 | 80 | 60 | 100 |
| HCR 1 | 10 | 30 | 50 | 0 | 0 | 0 | 0 | 0 | 0 |
| HCR 2 | 0 | 0 | 0 | 10 | 30 | 50 | 0 | 0 | 0 |
| HCR 3 | 0 | 0 | 0 | 0 | 0 | 0 | 20 | 40 | 0 |
| Haze, % | 58.4 | 55.1 | 97.5 | 99.0 | 100.0 | 100.0 | 101.0 | 101.0 | 99.8 |
| COF, static | 0.73 | 0.44 | 0.40 | 0.61 | 0.34 | 0.23 | 0.44 | 0.28 | 0.59 |
| COF, kinetic | 0.56 | 0.32 | 0.22 | 0.48 | 0.25 | 0.20 | 0.35 | 0.23 | 0.44 |
| Vicat, ° C. (200 g) | 56.60 | 44.30 | 41.10 | 57.40 | 45.70 | 46.00 | 63.70 | 65.60 | 62.10 |
| Tensile Properties | | | | | | | | | |
| Stress at break, psi | 2485 | 2113 | 1015 | 2423 | nb | 985 | 2296 | 2406 | 2754 |
| Strain at break, psi | 1873 | 1984 | 1259 | 1782 | nb | 345 | 1588 | 1635 | 1852 |
| Secant modulus (1%) | 17103 | 23352 | 60559 | 22619 | 35746 | 104703 | 24711 | 36063 | 23455 |
| Stress at yield, psi | 927 | 809 | 1347 | 958 | 1159 | 2437 | 1187 | 1478 | 1062 |
| Strain at yield, psi | 36 | 36 | 9 | 37 | 15 | 5 | 29 | 23 | 27 |

A variety of copolymer coating blends were similarly prepared from Copolymer B and HCR 1 or HCR 2, and designated as Examples 10 through 15. Pure Copolymer B (not blended with HCR) was used as a control and designated as Example 16. The compositions and mechanical properties of the resulting blends are given in Table 2. Specimens that did not break during stress and strain at break testing are designated by "nb". Specimens that did not yield during stress and strain at yield testing are designated by "ny".

FIG. 1 depicts Vicat softening temperature, haze, and coefficient of friction as a function of the amount of HCR for the polymer blends of Examples 1, 2, and 3. As evidenced by FIG. 1, haze, coefficient of friction, and Vicat softening temperature are all desirably lowered at a HCR level of approximately 30 wt %.

Figure 2:
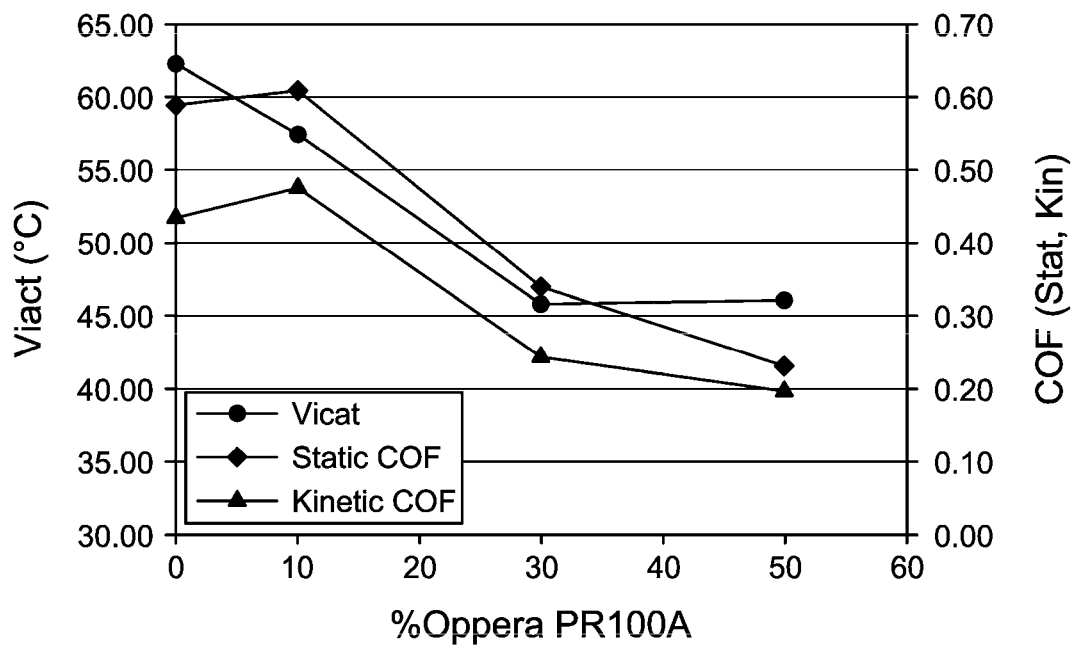
FIGS. 2 and 3 depict Vicat softening temperature and coefficient of friction as a function of the amount of hydrocarbon resin for polymer blend coatings according to the present invention.

FIG. 2 depicts Vicat softening temperature and coefficient of friction as a function of the amount of HCR for the polymer blends of Examples 4, 5, and 6. As shown in FIG. 2, Vicat

TABLE 2

| | Example No. | | | | | | |
|---|---|---|---|---|---|---|---|
| | 10 | 11 | 12 | 13 | 14 | 15 | 16 |
| Composition, wt % | | | | | | | |
| Copolymer B | 90 | 70 | 50 | 90 | 70 | 50 | 100 |
| HCR 1 | 10 | 30 | 50 | 0 | 0 | 0 | 0 |
| HCR 2 | 0 | 0 | 0 | 10 | 30 | 50 | 0 |
| Haze, % | 98.1 | 97.0 | 95.7 | 96.6 | 95.5 | 94.3 | 97.1 |
| COF, static | >1 | >1 | >1 | >1 | >1 | 2.21 | >1 |
| COF, kinetic | >1 | >1 | >1 | >1 | >1 | 0.81 | >1 |
| Vicat, ° C. (200 g) | 49.50 | 43.50 | 38.10 | 49.50 | 45.40 | 37.10 | 53.30 |
| Tensile Properties | | | | | | | |
| Strength at break, psi | nb | nb | nb | nb | nb | nb | |
| Ultimate elongation, % | nb | nb | nb | nb | nb | nb | |
| Tensile modulus at 100% | 225.80 | 145.70 | 104.20 | 236.70 | 162.50 | 203.90 | 211.90 |
| Tensile modulus at 200% | 243.30 | 162.30 | 118.00 | 254.10 | 179.20 | 207.30 | 230.20 |
| Tensile modulus at 300% | 259.00 | 172.50 | 128.10 | 269.10 | 191.40 | 215.10 | 249.90 |
| Stress at yield, psi | ny | ny | ny | ny | ny | 241.00 | ny |
| Strain at yield, psi | ny | ny | ny | ny | ny | 40.40 | ny |
| Secant modulus (1%) | 1306.00 | 629.00 | 467.00 | 1144.00 | 690.00 | 1310.00 | 1603.00 |

As shown in Tables 1 and 2, polymer blends containing HCR have tensile properties similar to the control polymers, but have lower Vicat softening temperatures and, in some cases, lower haze values and lower coefficients of friction. In particular, blends comprising approximately 30% HCR show significant improvement over the unblended comparative propylene copolymers.

softening temperature and coefficient of friction are both desirably lowered at HCR levels of approximately 30 wt % and 50 wt %. Haze values in Examples 4, 5, and 6 are unaffected by the amount of HCR present.

Figure 3:
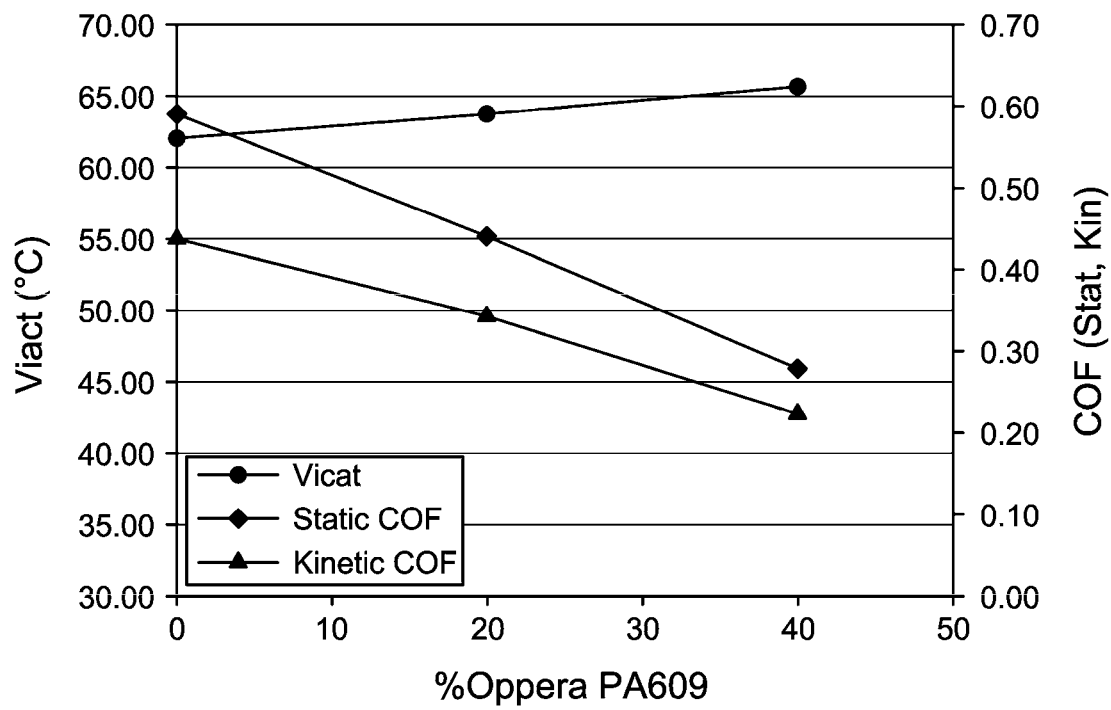

FIG. 3 depicts Vicat softening temperature and coefficient of friction as a function of the amount of HCR for the polymer blends of Examples 7 and 8. As shown in FIG. 3, the blends exhibit lower coefficients of friction at levels of both 20 wt % and 40 wt % HCR, while having only a minimal increase in Vicat softening temperature.

Figure 4:
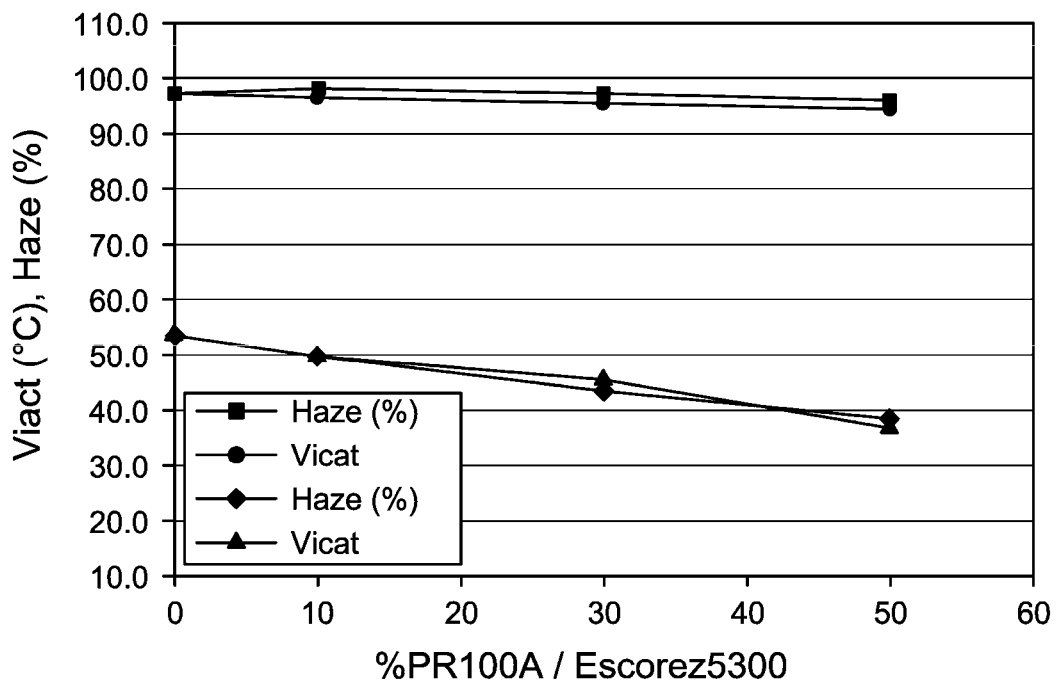
FIG. 4 depicts Vicat softening temperature and haze as a function of the amount of hydrocarbon resin for polymer blend coatings according to the present invention.

FIG. 4 depicts Vicat softening temperature and haze as a function of the amount of HCR for the polymer blends of Examples 10 through 15. As shown in FIG. 4, Vicat softening temperatures are desirably lowered at all reported levels of HCR, while haze is marginally lower.

Figure 5:
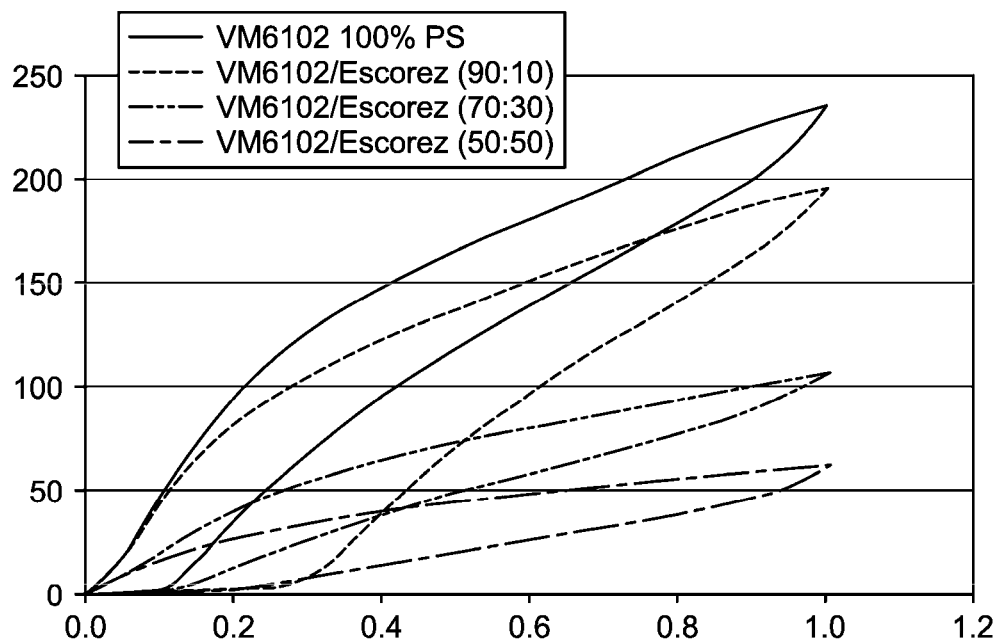
FIGS. 5, 6, 7, and 8 are 100% hysteresis curves for polymer blend coatings according to the present invention with and without pre-stretching.
Figure 6:
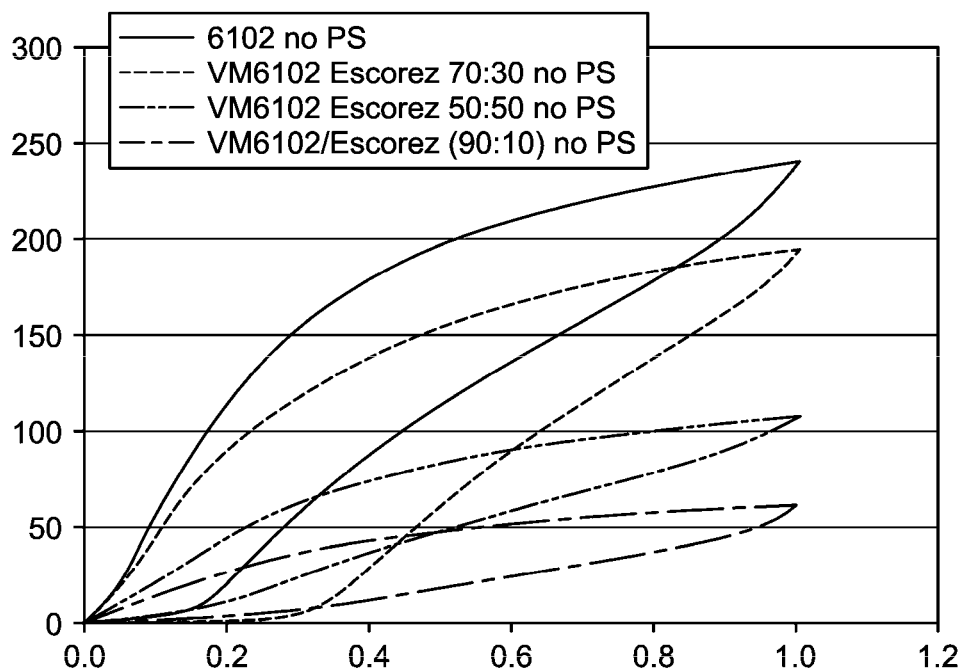

FIG. 5 illustrates 100% hysteresis curves for the polymer blends of Examples 10, 11, 12, and 16, with pre-stretching. FIG. 6 illustrates 100% hysteresis curves for Examples 10, 11, 12, and 16 without pre-stretching. As demonstrated by these figures, optimum softness and lowest permanent set are achieved for blend compositions comprising approximately 30 wt % HCR.

Figure 7:
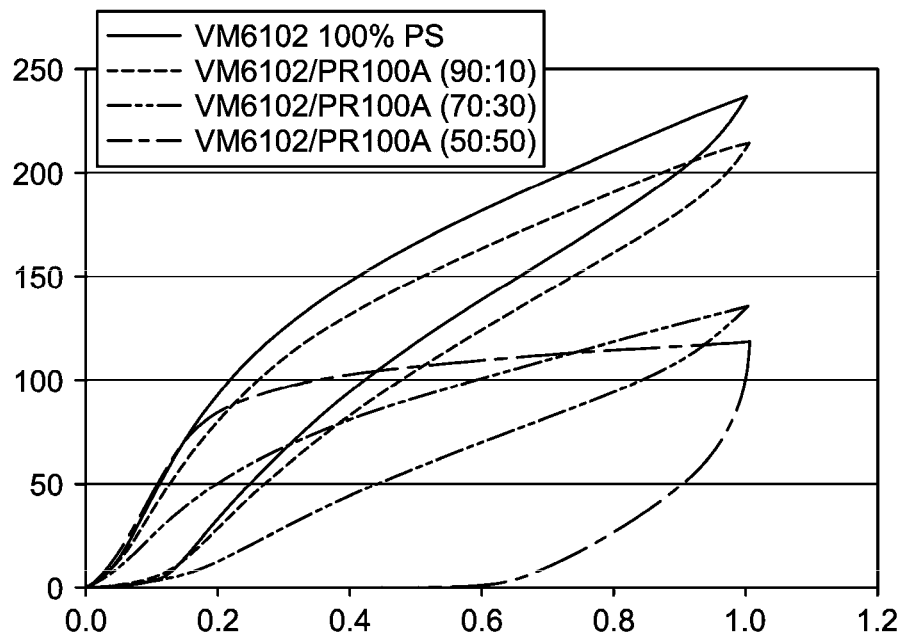
Figure 8:
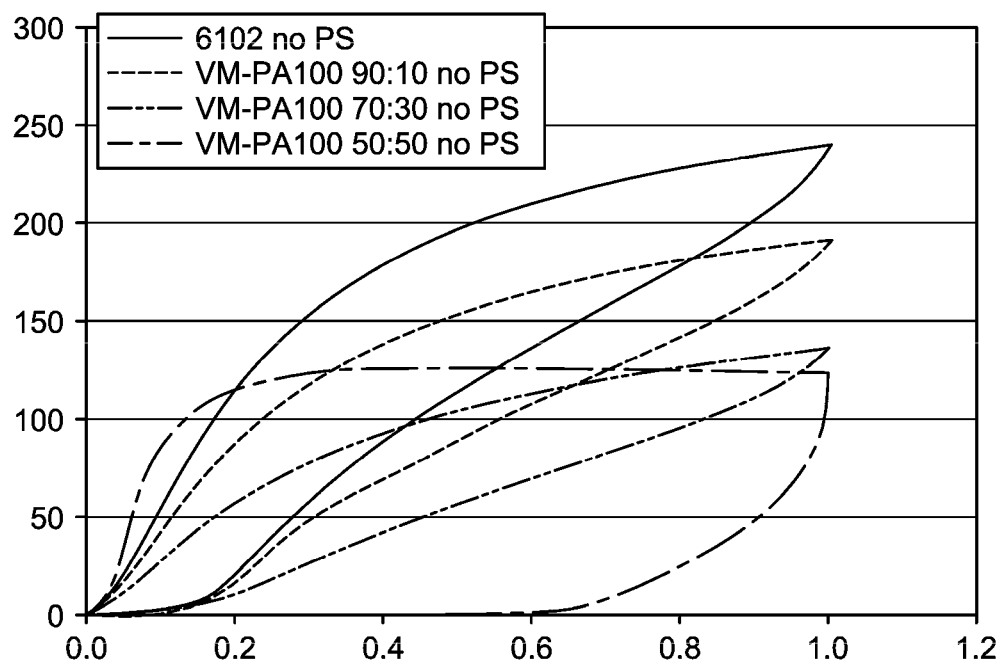

FIG. 7 illustrates 100% hysteresis curves for the polymer blends of Examples 13, 14, 15, and 16, with pre-stretching. FIG. 8 illustrates 100% hysteresis curves for Examples 13, 14, 15, and 16 without pre-stretching. As demonstrated by these figures, permanent set changes very little for blends with HCR levels up to approximately 30 wt %.

A variety of copolymer coating blends were prepared to test their suitability for use in hot fill applications, and designated as Examples 17 through 70. Of these, Examples 17-62 are comparative and Examples 63-70 illustrate embodiments of the invention. The compositions and hot fill performance of comparative Examples 17-62 are shown in Table 3. The compositions and hot fill performance of inventive Examples 63-70 are shown in Table 4.

TABLE 3

| Ex. # | Copol. A (wt %) | Copol. C (wt %) | Copol. D (wt %) | Copol. E (wt %) | Copol. F (wt %) | PP1 (wt %) | PP2 (wt %) | PP3 (wt %) | PP4 (wt %) | Erucamide (wt %) | Comments |
|---|---|---|---|---|---|---|---|---|---|---|---|
| 17 | | | 89 | | | 10 | | | | | Coating delaminated during preheat |
| 18 | | | 89 | | | 10 | | | | | Coating delaminated during preheat |
| 19 | | | 88 | | | 10 | | | | | Coating delaminated during preheat |
| 20 | | | 88 | | | 10 | | | | | Coating delaminated during preheat |
| 21 | | | 89 | | | | 10 | | | | Coating delaminated during preheat |
| 22 | | | 89 | | | | 10 | | | | Coating delaminated during preheat |
| 23 | | | 88 | | | | 10 | | | | Coating delaminated during preheat |
| 24 | | | 88 | | | | 10 | | | | Coating delaminated during preheat |
| 25 | 89 | | | | | | 10 | | | | Delaminated during preheat, coating stuck to mold cavity and tore off |
| 26 | 89 | | | | | | 10 | | | | Delaminated during preheat, coating stuck to mold cavity and tore off |
| 27 | 89 | | | | | | | 10 | | | Coating stuck to mold cavity and tore off |
| 28 | 89 | | | | | | | 10 | | 1 | Coating stuck to mold cavity and tore off |
| 29 | 89 | | | | | | | 10 | | | Coating stuck to mold cavity and tore off |
| 30 | 29 | | | | | | | 70 | | 1 | Loss in softness and definition, some tear off |
| 31 | 49 | | | | | | | 50 | | 1 | Loss in softness and definition, some tear off |
| 32 | 19 | | | | | | | 80 | | 1 | Loss in softness and definition, some tear off |
| 33 | 69 | | | | | | | 30 | | 1 | Acceptable softness and definition, no tear off |
| 34 | | 20 | 9 | | | 70 | | | | 1 | Loss in softness and definition, hard feel |
| 35 | | 50 | | | | 50 | | | | | Loss in softness and definition, hard feel |
| 36 | | 20 | | | | 80 | | | | | Loss in softness and definition, hard feel |
| 37 | | | 9 | 80 | | | | 10 | | 1 | Coating stuck to mold cavity and tore off |
| 38 | | | 9 | | 80 | 10 | | | | 1 | Coating stuck to mold cavity and tore off |
| 39 | 89 | | | | | | | | 10 | | Coating stuck to mold cavity and tore off |
| 40 | 89 | | | | | | | | 10 | 1 | Coating stuck to mold cavity and tore off |
| 42 | 79 | | | | | | | | 20 | 1 | Coating stuck to mold cavity and tore off |
| 43 | | | 54 | | | | | | 45 | 1 | Coating delaminated during preheat |
| 44 | 68 | | | | | | | 30 | | 0.5 | Haze too high |
| 45 | 69 | | | | | | | 30 | | 0.25 | Haze too high |
| 46 | 69.6 | | | | | | | 30 | | 0.1 | Limited effect on haze |
| 47 | 69.9 | | | | | | | 30 | | 0.025 | Good clarity, no initial delamination but shrunk over time and separated from PET substrate |
| 48 | 69 | | | | | | | 30 | | 1 | Good clarity, no initial delamination but shrunk over time and separated from PET substrate |
| 49 | 9 | 10 | | | | 80 | | | | 1 | Haze too high, delamination from PET substrate |
| 50 | 9 | 20 | | | | 70 | | | | 1 | Delamination when squeezed. |
| 51 | 9 | 30 | | | | 60 | | | | 1 | No initial delamination but shrunk over time and separated from PET substrate |
| 52 | 9 | 40 | | | | 50 | | | | 1 | Delamination when squeezed |
| 53 | 69.9 | | | | | | | 30 | | 0.025 | No delamination, definition ok |
| 54 | 69.9 | | | | | | | 30 | | 0.025 | No initial delamination but shrunk over time and separated from PET substrate |
| 55 | 69.9 | | | | | 30 | | | | 0.025 | MFR too low |
| 56 | 69.9 | | | | | | | | 30 | 0.025 | MFR too low, coating shrunk on bottle |
| 57 | 9 | 30 | | | | | | 60 | | 1 | Loss in softness |
| 58 | 9 | 30 | | | | 60 | | | | 1 | Loss in softness |

TABLE 3-continued

| Ex. # | Copol. A (wt %) | Copol. C (wt %) | Copol. D (wt %) | Copol. E (wt %) | Copol. F (wt %) | PP1 (wt %) | PP2 (wt %) | PP3 (wt %) | PP4 (wt %) | Erucamide (wt %) | Comments |
|---|---|---|---|---|---|---|---|---|---|---|---|
| 59 | 9 | | 30 | | | | 60 | | | 1 | MFR too low, coating shrunk on bottle |
| 60 | 9 | | 30 | | | | | | 60 | 1 | MFR too low, coating shrunk on bottle |
| 61 | | 49 | | | | | | 50 | | 1 | No initial delamination but shrunk over time and separated from PET substrate |
| 62 | 69 | | | | 30 | | | | | 1 | No initial delamination but shrunk over time and separated from PET substrate |

TABLE 4

| Ex. # | Copol. A (wt %) | Copol. C (wt %) | HCR 3 (wt %) | Erucamide (wt %) | Comments |
|---|---|---|---|---|---|
| 63 | 79 | | 20 | 1 | Good hot fill performance, no delamination |
| 64 | 69 | | 30 | 1 | Good hot fill performance, no delamination |
| 65 | 49 | | 50 | 1 | Good hot fill performance, no delamination |
| 66 | 70 | | 30 | | Good hot fill performance, no delamination |
| 67 | 69 | | 30 | 0.25 | Good hot fill performance, no delamination |
| 68 | 9 | 70 | 20 | 1 | Good hot fill performance, no delamination |
| 69 | 9 | 60 | 30 | 1 | Good hot fill performance, no delamination |
| 70 | 9 | 40 | 50 | 1 | Good hot fill performance, no delamination |

For purposes of convenience, various specific test procedures are identified above for determining certain properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

Having described the various aspects of the compositions herein, further specific embodiments of the invention include those set forth in the following lettered paragraphs:

A. A composite material comprising a substrate layer and a polymer blend coating composition disposed upon at least a portion of the substrate; wherein the coating composition comprises from about 50 to about 95 wt % of a propylene-based copolymer and from about 5 to about 50 wt % of one or more HCR, and wherein the propylene-based copolymer comprises propylene and from about 5 to 25 wt % units derived from ethylene and/or a $C_4$-$C_{10}$ α-olefin, and has a melting point less than about 110° C., a Hf less than about 75 J/g, and a triad tacticity greater than about 75%.

B. The composite material of paragraph A, wherein the coating composition comprises from about 25 to about 45 wt % of one or more HCR.

C. The composite material of any of the preceding paragraphs, wherein the coating has a static coefficient of friction less than or equal to about 0.55.

D. The composite material of any of the preceding paragraphs, wherein the coating has a static coefficient of friction less than or equal to about 0.50.

E. The composite material of any of the preceding paragraphs, wherein the coating has a kinetic coefficient of friction less than or equal to about 0.40.

F. The composite material of any of the preceding paragraphs, wherein the coating has a kinetic coefficient of friction less than or equal to about 0.35.

G. The composite material of any of the preceding paragraphs, wherein the coating has a Vicat softening temperature less than about 60° C.

H. The composite material of any of the preceding paragraphs, wherein the coating has a Vicat softening temperature less than about 50° C.

I. The composite material of any of the preceding paragraphs, wherein the coating has a haze value of about 60% or less.

J. The composite material of any of the preceding paragraphs, wherein the coating has two or more of the following properties: a static coefficient of friction less than or equal to about 0.55; a kinetic coefficient of friction less than or equal to about 0.40; a Vicat softening temperature less than about 60° C.; or a haze value less than or equal to about 60%.

K. The composite material of any of the preceding paragraphs, wherein the HCR has a glass transition temperature between about 35° C. and about 120° C., a Mw between about 100 g/mole and about 1000 g/mole, and a Mn between about 100 g/mole and about 500 g/mole.

L. The composite material of any of the preceding paragraphs, wherein the substrate is a bottle.

M. The composite material of paragraph L, wherein the bottle comprises PET.

N. The composite material of any of the preceding paragraphs, wherein the coating is able to retain textural design details.

O. A process for forming a composite material comprising: providing a substrate; and applying a coating composition onto at least a portion of the substrate; wherein the coating composition comprises from about 50 to about 95 wt % of a propylene-based copolymer and from about 5 to about 50 wt % of one or more HCR, and wherein the propylene-based copolymer comprises propylene and from about 5 to 25 wt % units derived from ethylene and/or a $C_4$-$C_{10}$ α-olefin, and has a melting point less than about 110° C., a Hf less than about 75 J/g, and a triad tacticity greater than about 75%.

P. A process for forming a composite material comprising: providing a substrate; applying a coating composition onto at least a portion of the substrate, wherein the coating composition comprises from about 50 to about 95 wt % of one or more propylene-based copolymers and from about 5 to about 50 wt % of one or more HCR, and wherein at least one, but optionally each, propylene-based copolymer comprises propylene and from about 5 to 25 wt % units derived from ethylene and/or a $C_4$-$C_{10}$ α-olefin, and has a melting point less than about 110° C., a Hf less than about 75 J/g, and a triad tacticity greater than about 75%; and molding the substrate in a blow molding process in which the temperature of the mold is greater than about 135° C.

Q. A process for forming a composite material comprising: providing a substrate; applying a coating composition onto at least a portion of the substrate, wherein the coating composition comprises from about 5 to about 15 wt % of a first propylene-based copolymer, from about 35 to about 80 wt % of a second propylene-based copolymer, and from about 5 to about 50 wt % of one or more hydrocarbon resins, and wherein at least one, but optionally each, propylene-based copolymer comprises propylene and from about 5 to 25 wt % units derived from ethylene and/or a $C_4$-$C_{10}$ α-olefin, and has a melting point less than about 110° C., a Hf less than about 75 J/g, and a triad tacticity greater than about 75%; and molding the substrate in a blow molding process in which the temperature of the mold is greater than about 135° C.

R. The process of paragraph P or Q, wherein the temperature of the mold is greater than about 140° C.

S. The process of any of paragraphs P through R, wherein the temperature of the mold is greater than about 145° C.

T. The process of any of paragraphs O-S, wherein the coating composition comprises from about 25 to about 45 wt % of one or more HCR.

U. The process of any of paragraphs O-T, wherein the coating has a static coefficient of friction less than or equal to about 0.55.

V. The process of any of paragraphs O-U, wherein the coating has a kinetic coefficient of friction less than or equal to about 0.40.

W. The process of any of paragraphs O-V, wherein the coating has a Vicat softening temperature less than about 60° C.

X. The process of any of paragraphs O-W, wherein the coating has two or more of the following properties: a static coefficient of friction less than or equal to about 0.55; a kinetic coefficient of friction less than or equal to about 0.40; a Vicat softening temperature less than about 60° C.; or a haze value less than or equal to about 60%.

Y. The process of any of paragraphs O-X, wherein the HCR has a glass transition temperature between about 35° C. and about 120° C., a Mw between about 100 g/mole and about 1000 g/mole, and a Mn between about 100 g/mole and about 500 g/mole.

Z. The process of any of paragraphs O-Y, wherein the substrate is a bottle.

AA. The process of paragraph Z, wherein the bottle comprises PET.

BB. The process of any of paragraphs O-AA, wherein the coating is able to retain textural design details.

CC. The process of any of paragraphs O-BB, wherein the coating is applied to at least a portion of the substrate by extrusion.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

I claim:

1. A process for forming a composite material, comprising: applying a coating composition onto at least a portion of a plastic substrate; wherein the coating composition is a polymer blend comprising from about 50 to about 95 wt % of one or more propylene-based copolymers and from 30 wt % to about 50 wt % of one or more hydrocarbon resins, wherein at least one propylene-based copolymer comprises propylene and from about 5 to 25 wt % units derived from ethylene and/or a $C_4$-$C_{10}$ α-olefin, and has a melting point less than about 105° C., a heat of fusion less than about 75 J/g, and a triad tacticity greater than about 75%; and
molding the coated substrate in a blow molding process in which the temperature of the mold is greater than about 135° C.

2. The process of claim 1, wherein the plastic substrate is made of polyethylene terephthalate, and the temperature of the mold is greater than about 140° C.

3. The process of claim 2, wherein the temperature of the mold is greater than about 145° C.

4. The process of claim 1, wherein the coating composition has a static coefficient of friction less than or equal to about 0.55.

5. The process of claim 1, wherein the coating composition has a kinetic coefficient of friction less than or equal to about 0.40.

6. The process of claim 1, wherein the coating composition has two or more of the following properties:
  a. a static coefficient of friction less than or equal to about 0.55;
  b. a kinetic coefficient of friction less than or equal to about 0.40;
  c. a Vicat softening temperature less than about 60° C.; or
  d. a haze value less than or equal to about 60%.

7. The process of claim 1, wherein the hydrocarbon resin has a glass transition temperature between about 35° C. and about 120° C., a Mw between about 100 g/mole and about 1000 g/mole, and a Mn between about 100 g/mole and about 500 g/mole.

8. The process of claim 1, wherein the substrate is a bottle.

9. The process of claim 8, wherein the bottle comprises polyethylene terephthalate.

10. The process of claim 1, wherein the molding imparts one or more textural design details onto the coating composition, and wherein the one or more textural design details are retained by the coating composition after molding.

11. The process of claim 1, wherein the coating composition is applied to at least a portion of the substrate by extrusion.

12. A process for forming a composite material, comprising:
   applying a coating composition onto at least a portion of a plastic substrate;
   wherein the coating composition is a polymer blend comprising from about 5 to about 15 wt % of a first propylene-based copolymer, from about 35 to about 80 wt % of a second propylene-based copolymer, and from 30 wt % to about 50 wt % of one or more hydrocarbon resins, wherein at least one propylene-based copolymer comprises propylene and from about 5 to 25 wt % units derived from ethylene and/or a $C_4$-$C_{10}$ α-olefin, and has a melting point less than about 105° C., a heat of fusion less than about 75 J/g, and a triad tacticity greater than about 75%; and
   molding the coated substrate in a blow molding process in which the temperature of the mold is greater than about 135° C.

13. The process of claim 12, wherein the temperature of the mold is greater than about 140° C.

14. The process of claim 13, wherein the plastic substrate is made of polyethylene terephthalate, and the temperature of the mold is greater than about 145° C.

15. The process of claim 12, wherein the coating composition has a static coefficient of friction less than or equal to about 0.55.

16. The process of claim 12, wherein the coating composition has a kinetic coefficient of friction less than or equal to about 0.40.

17. The process of claim 12, wherein the hydrocarbon resin has a glass transition temperature between about 35° C. and about 120° C., a Mw between about 100 g/mole and about 1000 g/mole, and a Mn between about 100 g/mole and about 500 g/mole.

18. The process of claim 12, wherein the substrate is a bottle.

19. The process of claim 18, wherein the bottle comprises polyethylene terephthalate.

20. The process of claim 12, wherein the molding imparts one or more textural design details onto the coating composition, wherein the one or more textural design details are retained by the coating composition after molding.

21. The process of claim 12, wherein the coating composition is applied to at least a portion of the substrate by extrusion.

22. A process for forming a composite material, comprising:
   applying a coating composition onto at least a portion of a plastic substrate; wherein the coating composition is a polymer blend comprising from about 50 to about 95 wt % of one or more propylene-based copolymers and from 30 wt % to about 50 wt % of one or more hydrocarbon resins, wherein at least one propylene-based copolymer comprises propylene and from about 5 to 25 wt % units derived from ethylene and/or a $C_4$-$C_{10}$ α-olefin, and has a melting point less than about 105° C., a heat of fusion less than about 75 J/g, and a triad tacticity greater than about 75%; and
   molding the coated substrate in a blow molding process in which the temperature of the mold is greater than about 135° C., and further in which a textural detail with resolution less than 1 mm is imparted to, and retained by, the coating composition on the substrate.

23. The process of claim 22, wherein the coating composition consists essentially of the one or more propylene-based copolymers and the one or more hydrocarbon resins.

24. The process of claim 23, wherein the coating composition comprises about 30 wt % of the one or more hydrocarbon resins.

* * * * *